Aug. 28, 1956

C. H. WILLSEY 2,760,536

EGG CRACKING MECHANISM

Filed Oct. 18, 1952

INVENTOR.
Charles H. Willsey,
BY
Cromwell, Greist & Warden
ATTYS

Aug. 28, 1956
C. H. WILLSEY
2,760,536
EGG CRACKING MECHANISM
Filed Oct. 18, 1952
8 Sheets-Sheet 2
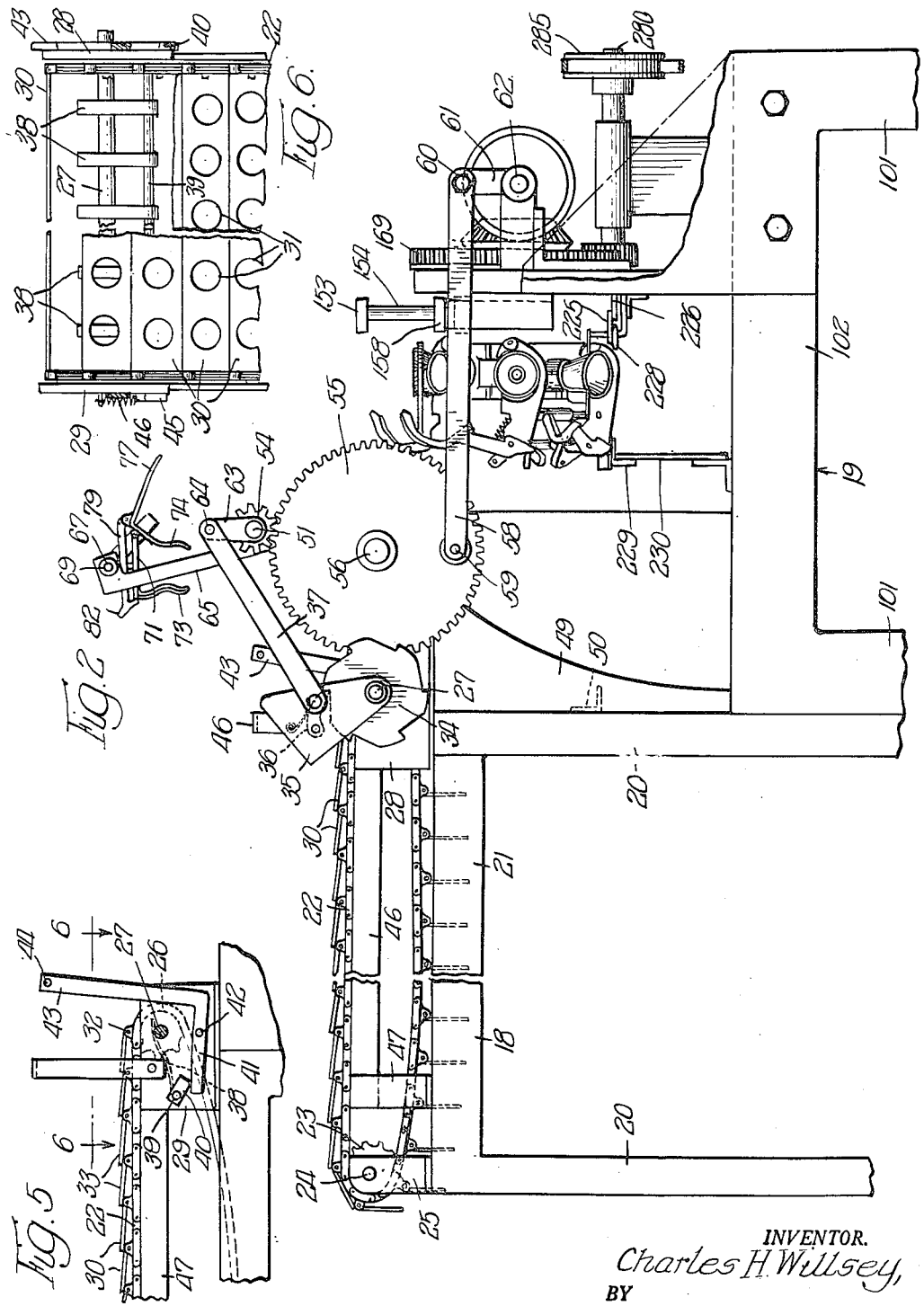
INVENTOR.
Charles H. Willsey,
BY
Cromwell, Greist & Warden
Attys.

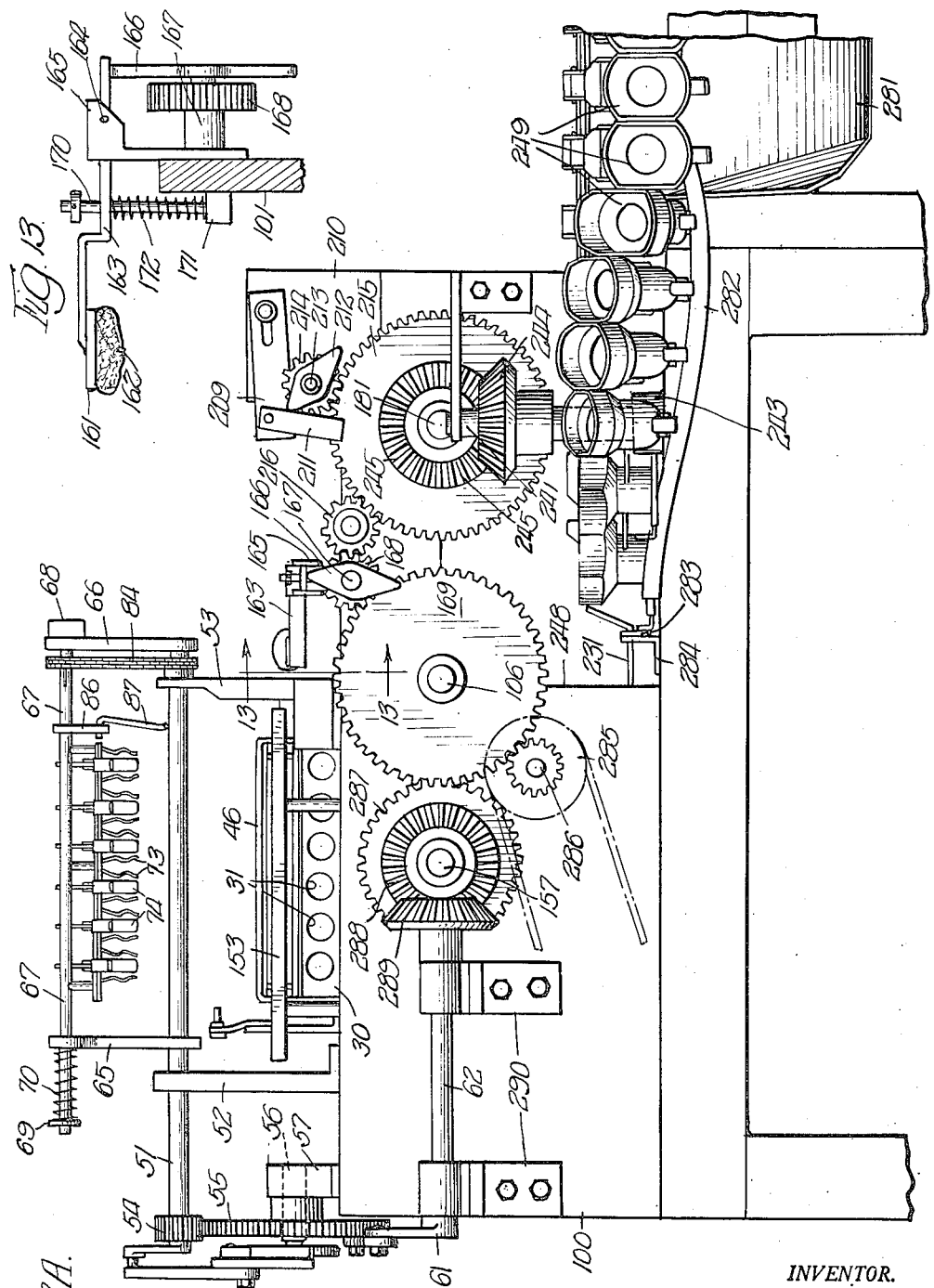

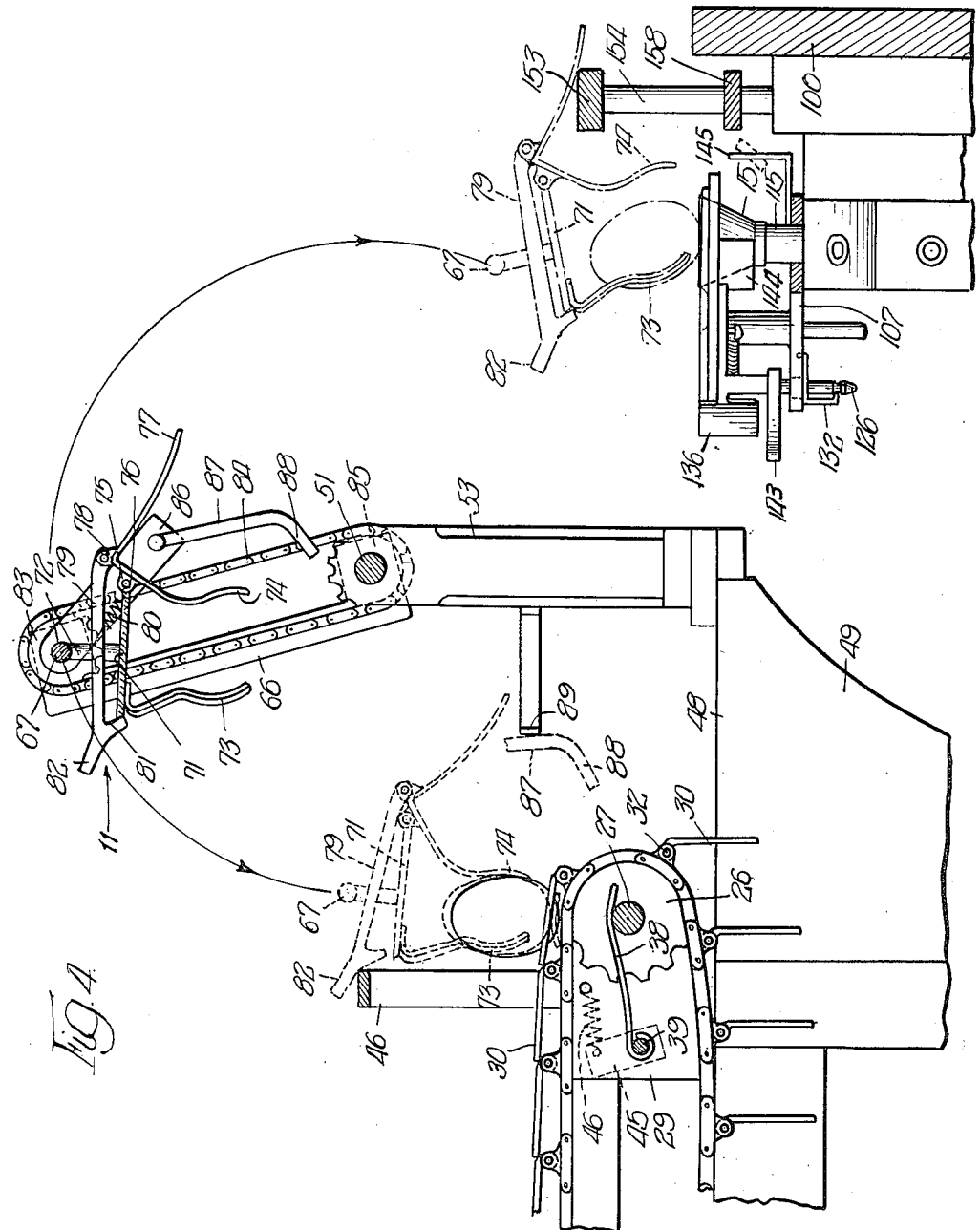

Aug. 28, 1956
C. H. WILLSEY
2,760,536
EGG CRACKING MECHANISM
Filed Oct. 18, 1952
8 Sheets-Sheet 5
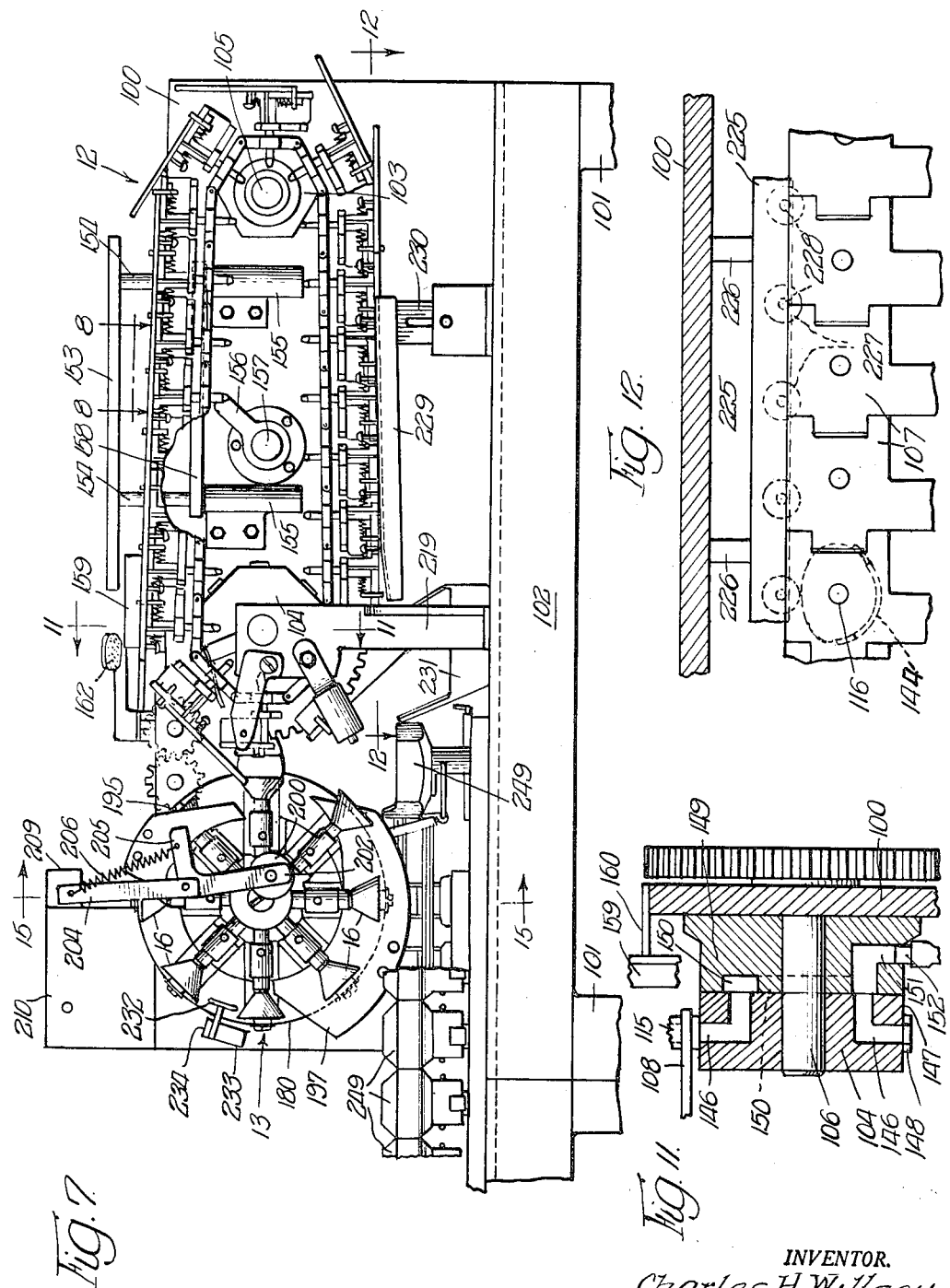
INVENTOR.
*Charles H. Willsey,*
BY
*Cromwell, Greist & Warden*
ATTYS.

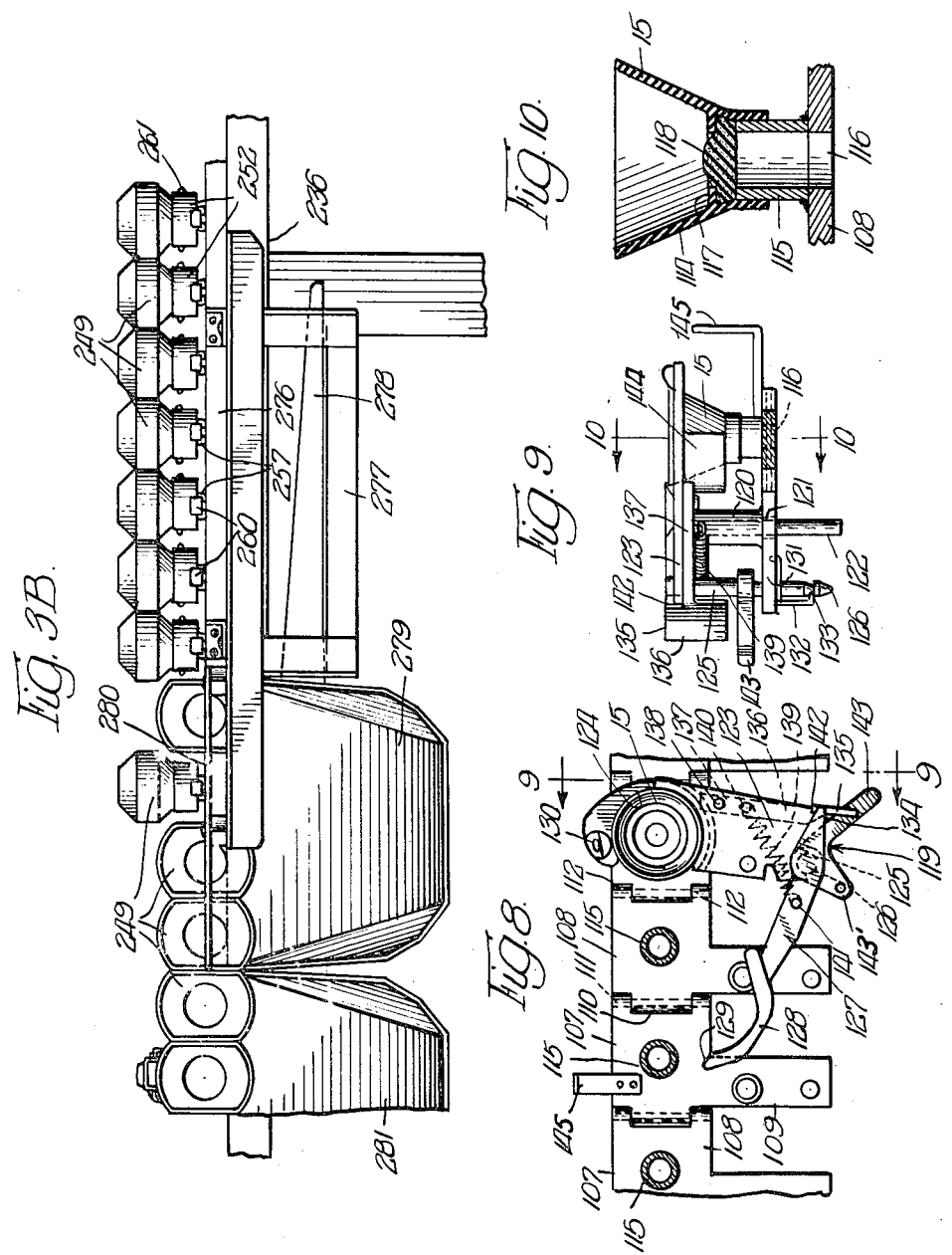

Aug. 28, 1956  C. H. WILLSEY  2,760,536
EGG CRACKING MECHANISM
Filed Oct. 18, 1952  8 Sheets-Sheet 7

INVENTOR.
Charles H. Willsey
BY
Cromwell, Greist & Warden
Attys.

Aug. 28, 1956 — C. H. WILLSEY — 2,760,536
EGG CRACKING MECHANISM
Filed Oct. 18, 1952 — 8 Sheets-Sheet 8
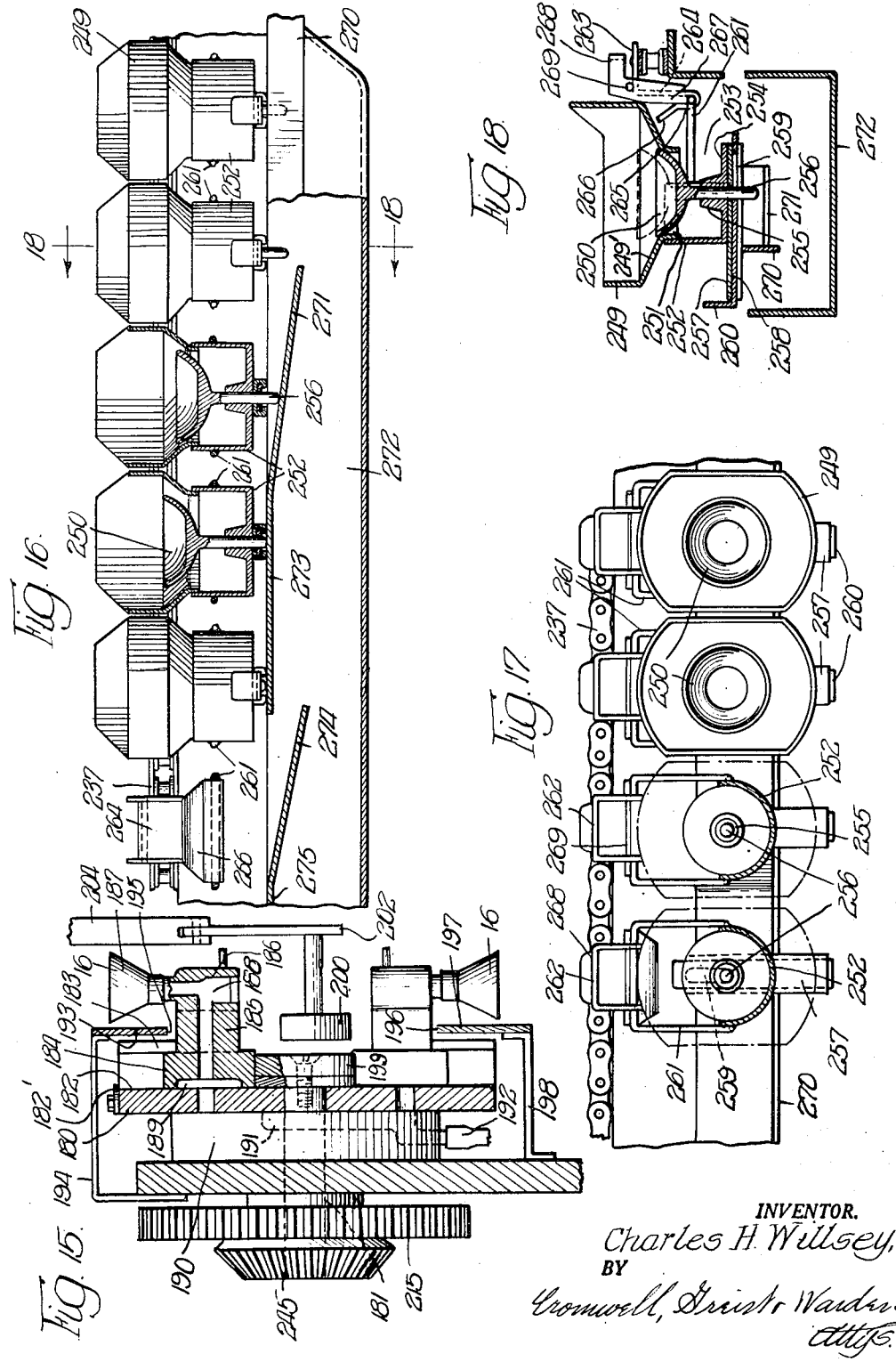
INVENTOR.
Charles H. Willsey,
BY
Cromwell, Griest & Warden
ATTYS.

United States Patent Office 2,760,536
Patented Aug. 28, 1956

2,760,536

EGG CRACKING MECHANISM

Charles H. Willsey, Topeka, Kans.

Application October 18, 1952, Serial No. 315,447

26 Claims. (Cl. 146—2)

This invention relates to egg handling apparatus and is more particularly concerned with improvements in a machine having mechanism for cracking or breaking successive eggs and separating the broken shell portions to deliver the contents therefrom together with cooperating mechanism for receiving the egg contents and for separating the yolks from the whites.

Mechanisms which have heretofore been proposed for breaking or cracking eggs, separating the broken or cracked shell into portions and delivering the contents from the separated shell portions, with means being provided for separating the yolks and the whites, have not been satisfactory primarily because they have not operated efficiently upon the eggs or because they have not met necessary sanitation requirements.

It is a general object of the present invention to provide an improved egg handling machine having mechanism for advancing successive eggs to a cracking station, mechanism for automatically cracking or breaking the shells of the successive egg and delivering the contents thereof from the broken shells to successive receptacles at the cracking station and mechanism for conveying the successive receptacles from the cracking station while simultaneously separating the yolk from the whites, wherein the eggs are handled in an efficient manner and wherein adequate provision is made for maintaining the machine in a sanitary condition.

It is a more specific object of the invention to provide a machine wherein a plurality of eggs are delivered on end to a holding or supporting conveyor, the individual eggs are advanced along a predetermined path to a point where, with both ends gripped, the shell is cracked and separated into two portions which are moved to inverted position to discharge or dump the contents therefrom, and wherein a plurality of conveyor carried receptacles for receiving the egg contents are provided which are moved in a closed path with mechanism along the latter path operative on the receptacles to separate the yolks from the whites and to discharge the same into separate receiving trays or containers.

It is another object of the invention to provide in an egg cracking machine an endless conveyor mechanism having a plurality of egg receiving suction cups thereon, a rotary frame at one end of the conveyor also having a plurality of suction cups thereon which are arranged to cooperate with the suction cups on the conveyor mechanism whereby to grasp each egg at opposite ends as the cups on the conveyor mechanism and on the rotary frame move into cooperating relation, in combination with cracking knives pivoted on the conveyor mechanism adjacent each of the suction cups, and mechanism for operating the knives to strike and break the shells of successive eggs as they are grasped by the cooperating suction cups whereby the shells are divided into separate portions and the contents are discharged or dumped as the suction cups on the conveyor mechanism and the rotary frame advance in their respective paths and carry the shell portions in opposite directions.

It is a further object of the invention to provide in an egg cracking machine an endless conveyor having a plurality of egg receiving suction cups thereon, a rotary frame mounted at one end of the endless conveyor having a plurality of similar cups arranged thereon to cooperate with the suction cups on the endless conveyor, whereby to grasp each egg at opposite ends as the cups on the conveyor move around the end of the same, in combination with spring loaded cracking knives pivoted on the conveyor adjacent each of the suction cups and mechanism for actuating the knives to strike and break the shells of successive eggs as they are grasped by the cooperating suction cups whereby the shells are divided into separate portions and the contents are discharged or dumped as the suction cups advance in their respective paths and the shell portions move in opposite directions.

It is another object of the invention to provide in an egg cracking machine a transfer mechanism for delivering a plurality of eggs, arranged in row formation, from a feed conveyor to a continuously moving cracking conveyor, with the eggs being deposited on the cracking conveyor for advancing movement thereby in single file relation.

It is a further object of the invention to provide in an egg cracking machine a cracking conveyor having a plurality of egg holding members thereon and a cracking assembly associated with each holding member for gauging the size of the egg and cracking the shell thereof as it reaches a cracking station where separation of the cracked portions of the shell will automatically discharge the contents therefrom.

It is a still further object of the invention to provide in an egg cracking machine an endless conveyor having a plurality of suction cups thereon each of which is adapted to grasp and hold an end of an egg, each of the cups having a combination size gauging and cracking knife assembly associated therewith which is adapted to automatically position a cracking knife for cracking the shell of the egg, regardless of the size of the egg, and to insure that the cracking knife engages the shell sufficiently to break the shell without breaking the yolk or otherwise disturbing the contents of the egg.

It is another object of the invention to provide in an egg cracking machine a cracking conveyor having thereon a plurality of suction cups for holding the eggs and a cracking knife assembly removably mounted adjacent each suction cup together with mechanism for adjusting the cracking knife assembly to a predetermined position, according to the size of the egg held in the associated suction cups, to position a cracking knife for automatically breaking the egg shell when the suction cup is advanced to a cracking station at one end of the conveyor.

It is a further object of the invention to provide in an egg cracking machine a continuously movable cracking conveyor having a plurality of flexible suction cups thereon with each of the cups being adapted to receive one end of an egg and a cooperating continuously movable conveyor having a plurality of flexible suction cups thereon with each of the cups adapted to be moved successively into opposed relation to a cup on the cracking conveyor for engaging the end of the egg received therein whereby the eggs are moved through a predetermined cracking position while confined at both ends and egg shell releasing mechanism associated with each conveyor for engaging the flexible cups to insure release of the shell portions therefrom after the cups advance beyond the cracking position.

It is another object of the invention to provide in an egg cracking machine a conveyor having removably mounted thereon a plurality of cup assemblies for receiving the contents of the eggs as they are broken and the shell portions are separated wherein the cup assemblies comprise a main portion have a bottom aperture therein and a yolk holding portion movably mounted in the aperture and normally closing the same and wherein cam elements are provided along the path of the conveyor for elevating the yolk holding portions to permit the albumen to drain through the bottom apertures in the main portions of the cup assemblies and wherein the cup assemblies are swingable relative to the conveyor to a yolk dumping position at a predetermined point in their path of movement.

It is a further object of the invention to provide in a mechanism of the type described conveyor mounted egg contents receiving cups and mechanism associated therewith whereby the cups may be adjusted to swing relative to the conveyor for dumping the contents at different locations along the conveyor to permit selective separation of the contents into different receiving containers.

These and other objects of the invention will be apparent from a consideration of the egg handling machine which is shown by way of illustration in the accompanying drawings, wherein:

Fig. 2 is an elevation of one side of the machine, to a larger scale, showing, particularly, the egg feeding mechanism;

Figure 1:
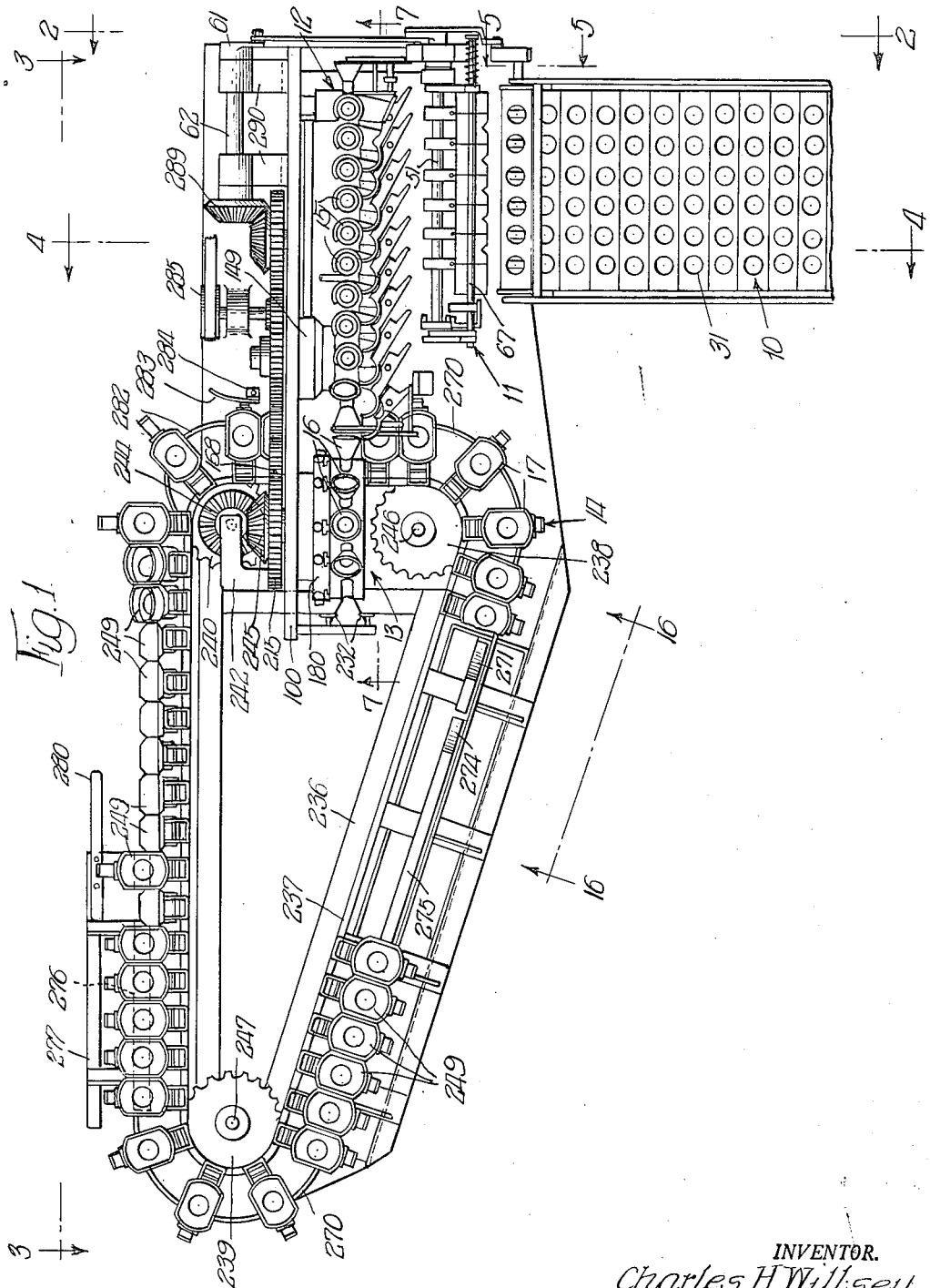
Fig. 1 is a plan view, with portions broken away, of a machine embodying the principal features of applicant's invention.
Figure 14:
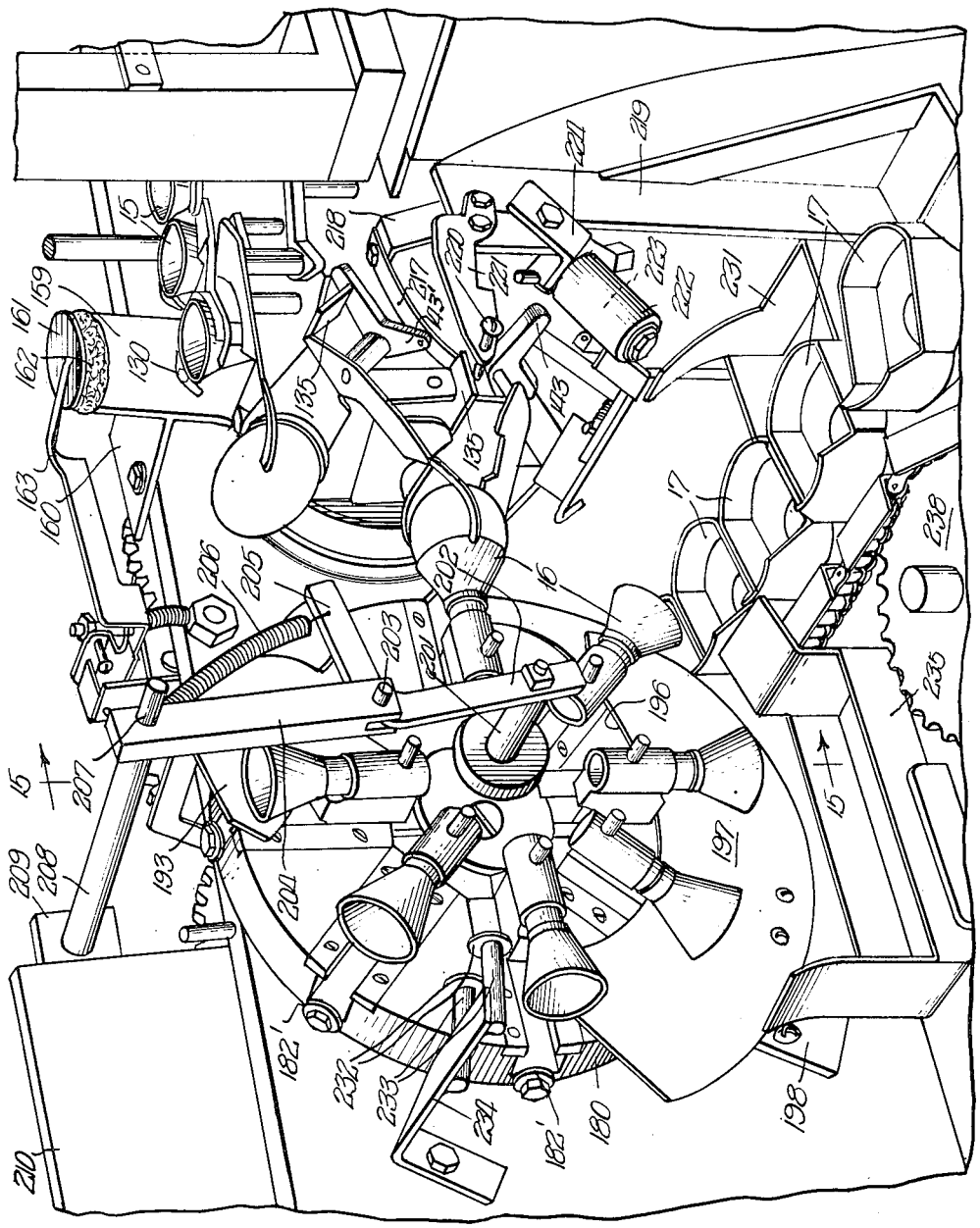

Figs. 3A and 3B together constitute an enlarged elevation of another side of the machine, showing particularly the drive mechanism and portions of the separating cups and their conveyor mechanism;

Fig. 4 is a section taken generally on the line 4—4 of Fig. 1, to an enlarged scale;

Fig. 5 is a fragmentary detailed view taken on the line 5—5 of Fig. 1, to an enlarged scale;

Fig. 6 is a fragmentary plan view taken on the line 6—6 of Fig. 5;

Fig. 7 is a section taken on the line 7—7 of Fig. 1, to an enlarged scale and with portions broken away;

Fig. 8 is a fragmentary plan view of a portion of the cracking conveyor mechanism, taken on the line 8—8 of Fig. 7, and to an enlarged scale;

Fig. 9 is a section taken on the line 9—9 of Fig. 8;

Fig. 10 is a section taken on the line 10—10 of Fig. 9, to an enlarged scale;

Fig. 11 is a detail section taken on the line 11—11 of Fig. 7;

Fig. 12 is a detail section taken on the line 12—12 of Fig. 7;

Fig. 13 is an enlarged detail section taken on the line 13—13 of Fig. 3A;

Fig. 14 is a perspective view on an enlarged scale of the mechanism at the cracking station;

Fig. 15 is a detail section taken on the line 15—15 of Fig. 14;

Fig. 16 is an enlarged fragmentary elevation taken on the line 16—16 of Fig. 1, with portions broken away and other portions in section;

Fig. 17 is a fragmentary plan view of the mechanism shown in Fig. 16; and

Fig. 18 is a detail section taken on the line 18—18 of Fig. 16.

Referring particularly to Fig. 1 of the drawings the general arrangement and operation of the machine will first be described. The machine comprises a feed or loading conveyor 10 for supplying eggs in successive row arrangement, a transfer mechanism 11 for delivering successive rows of the eggs to an egg supporting or cracking conveyor mechanism 12 which advances the eggs to a cracking station, a rotary head or holding mechanism 13 which cooperates with the cracking conveyor mechanism 12 to hold successive eggs at the cracking station, and a separating and delivering conveyor mechanism 14 for receiving the contents of successive eggs at the cracking station and thereafter separating the whites and the yolks and delivering the same separately from the machine.

The loading or feeding conveyor 10 is arranged to move in a horizontal plane and receives the eggs on its upper run. The eggs are positioned on the conveyor 10 either manually, or by automatic placing and delivering means. The conveyor 10 moves the eggs up to a position beneath the transfer mechanism 11 in rows of six extending transversely of the conveyor. The transfer mechanism 11 picks up successive rows of eggs from the feeding conveyor 10 and moves through a circular path of approximately 180° to deliver them to the upper run of the conveyor mechanism 12 which is operative in a vertical plane, with the upper run spaced forwardly of the end of the conveyor 10. The conveyor mechanism 12 which receives the eggs with the ends thereof seated in a series of suction cups or holders 15 advances the eggs in a single line around the leading end thereof to bring each successive egg into a generally horizontal position where the cracking occurs. Each egg is held at the cracking station with one end in a holding cup 15 on the conveyor 12 and with the other end in a cooperating holding cup 16 on the rotary head 13 which is arranged adjacent the leading end of the conveyor 12. While held at the cracking station the successive eggs are broken, or cracked, and as the conveyor 12 and head 13 continue their advancing movement the halves of the shells move around beneath the conveyor 12 and the holding head 13, respectively, with the contents thereof being dumped into a contents receiving cup or receptacle 17 on the separating conveyor 14. As the latter advances the receiving cup 17 beyond the cracking station the yolks and the whites are separated and delivered into separate containers.

The feed conveyor 10 and the transfer mechanism 11 are mounted on an independent auxiliary supporting frame 18 (Fig. 2) for movement away from the main frame 19 which supports the remainder of the machine, to facilitate cleaning and assembling operations. The feed conveyor supporting frame 18 comprises the corner uprights 20 and the top frame members 21. The conveyor 10 comprises laterally spaced endless side chains 22, mounted at one end on the sprockets 23, the latter being supported on a cross shaft 24 extending between upstanding bearing plates 25 on the top portion 21 of the supporting frame. At the other end the chains 22 are supported on sprockets 26 which are mounted on a cross shaft 27 extending between upstanding brackets 28 and 29. The eggs are supported on a series of cross plates 30 each of which is provided with six holes 31, each of the holes being adapted to support an egg with the long axis arranged in a vertical direction. The plates 30 are each pivotally mounted on a cross shaft 32 at the forward end which is mounted in pivotal relation on brackets 33 arranged on the top portions of the links on the side chains 22. The cross shaft 27 at the forward end of the conveyor is extended outwardly at one side of the conveyor and carries on its outer end an operating ratchet wheel 34. A saddle 35, pivotally mounted on the shaft 27, straddles the ratchet wheel 34 and carries a spring pressed dog 36 which engages the ratchet wheel 34. The saddle 35 is operated or oscillated by means of the link 37 which is pivotally connected at one end to the saddle 35 and at the other end to the transfer mechanism 11 in a manner which will be described. At each operation of the transfer mechanism the ratchet 34 is rotated to advance the feed conveyor the distance necessary to position the next row of eggs for the transfer operation.

The conveyor 10 is provided at its forward (Figs. 4–6) end with an egg lifting mechanism for positioning the eggs for proper engagement by the transfer mechanism 11. The lifting mechanism comprises a plurality of relatively narrow elongate lifting plate members 38 which are positioned with their forward ends beneath the apertures 31 in the plate 30 as the plate 30 moves up to the end of the conveyor in proper position for delivery therefrom of the eggs which are supported in the apertures 31. The lifting plates or fingers 38 are secured in forwardly extending relation on a rock shaft 39 journaled in the side supporting plates 28 and 29. The rock shaft 39 is extended at one end and provided with a relatively small arm member 40 (Fig. 5) which is adapted to be engaged by one arm 41 of a bell crank, the latter being pivotally mounted at 42 on the support plate 28 with the other arm 43 thereof extending upwardly therefrom and carrying a pin 44 which is engaged by the transfer device as the transfer device 11 is operated to position the egg engaging portion thereof above the end of the conveyor 10. At the other end the rock shaft 39 is extended slightly and carries an arm 45. A tension spring 46 connected at one end to the arm 45 and at the other end to a fixed portion of the supporting plate 29 tends to urge the rock shaft 39 in the direction for retracting the lifter plates 38, the ends of the plates 38 being immediately above the conveyor drive or cross shaft 27. A generally U-shaped cam bar 46 extends above the end of the conveyor 10 with its legs fastened to the support plates 28 and 29. The upper run of the conveyor 10 is supported in horizontal position by support members extending longitudinally above the top frame members 21 which are supported by the side plates 28 and 29 at one end and by upstanding brackets 47 at the other end.

The egg transfer mechanism 11 is mounted on a supporting plate member 48 extending horizontally at the forward end of the frame support for the conveyor 10, which plate member is itself supported by vertically extending side plates 49 and a cross bar connecting structure 50. A rock shaft 51 extends transversely of the path of the conveyor 10 and is journaled in upright supporting posts or brackets 52, 53 (Fig. 3A) which are in turn supported in the horizontal plate member 48. At one end the rock shaft 51 is extended beyond the post 52 and carries a small gear 54 at its outer end which is in driving relation with the larger gear 55 supported on a stub shaft 56 which is journaled in a bearing 57 extending upwardly of the support plate 48. The gear 55 is oscillated by means of a link 58 (Fig. 2) which has one end pivotally connected at 59 to the gear 55 and the other end pivotally connected at 60 to an eccentric 61 mounted on a power shaft 62. Oscillation of the link 58 by the power shaft 62 causes oscillation of the gear 55 which oscillates the small gear 54 on the end of the rock shaft 51. The shaft 51 has an arm 63 mounted on the end thereof which is pivotally connected at 64 to the end of the link 37 so that each oscillation of the rock shaft 51 advances conveyor 10 one step to present a row of eggs for the next operation of the transfer device.

The rock shaft 51 has mounted thereon adjacent the supporting standards 52 and 53 a pair of supporting arm members 65, 66 of generally U-shaped formation, these arm members each having a relatively long bight portion and relative short leg portions and one of the legs of each of the members being secured to the rock shaft 51. A smaller rock shaft 67 is journaled in the outer free ends or legs of the support arms 65, 66. The smaller rock shaft 67 is provided at one end with a collar 68 and is extended at the other end and carries thereon a collar 69 and a compression spring 70 between the collar 69 and the adjacent support arm 65, the shaft 67 being supported in the ends of the arms 65 and 66 so that it is capable of both rotative and longitudinal sliding movement relative to the arms 65 and 66. The sliding movement is resisted by the spring 70 which urges the shaft 67 toward its normal position when it is free. The rock shaft 67 carries a gripper support plate 71 which is connected thereto by a plurality of posts 72 depending from the shaft 67. The plate 71 carries on its opposite or lower face a plurality of gripper assemblies for engaging and gripping the row of eggs while they are in transit from the feeding conveyor 10 to the cracking conveyor 12.

Each of the egg gripper assemblies comprises a pair of depending fixed gripper fingers 73 (Fig. 4) which are arranged in spaced relation adjacent one side edge of the supporting plate 71 and a movable gripper member 74 pivotally mounted at the other side edge of the plate 71. The movable gripper member 74 is provided with bearing forming ears or trunnions 75 which are received on a pivot rod 76 secured along the forward edge of the plate 71 so that the member 74 may be swung toward and from the gripper fixed members 73. Each of the grippers 74 is provided with an angular related finger member 77 which extends outwardly of the edge of the plate 71 and of the pivot rod 76 and which controls the movement of the gripper 74. The arm 77 is provided with an upstanding pair of ears 78 to which there is pivotally connected one end of a latching bar element 79, the latching element 79 extending generally parallel to the uppermost face of the plate 71 and across the same. The latching bar 79 is urged toward the uppermost face of the plate 71 by a tension spring 80 which is connected at one end to an intermediate portion of the bar 79 and at the other end to the plate 71. At the free end of the latching bar 79 a notched formation 81 is provided in the bottom of the bar to engage in latching relation the edge of the plate 71 when the gripper member 74 is moved to a predetermined gripping position. The latch bar 79 is extended at 82 for engagement with the cam or tripping bar 46 on the conveyor 10 when the transfer mechanism is operated to position the gripper assemblies over a row of eggs at the leading end of a conveyor 10. The arms 74 of the gripper assemblies are, of course, held in non-engaging or open relation until the transfer plate 71, carrying the gripper assemblies, approaches the proper position for picking up the row of eggs, above the leading end of the conveyor 10, when further movement of the plate 71 engages the ends 82 of the latch bars 79 with the cam bar 46 and allows the gripper arms 74 to pivot into closed position engaging the eggs on the conveyor plate 30. During the movement of the transfer assemblies the supporting plate 71 is held in a generally horizontal position by mechanism controlling the rotation of the rock shaft 67 as it is swung by movement of its support arms 65 and 66 through an arc of approximately 180°. The rock shaft 67 carries at one end a sprocket 83 which rotates with the shaft 67 and which is connected by a drive chain 84 with a sprocket 85 fixed on the rock shaft 51. The sprocket 83 is splined on the shaft 67 so that it rotates with the shaft 67 but is slidable thereon and permits the shaft 67 to move axially without misalignment of the sprockets 83 and 85. As the arms 65 and 66 are swung in their path of movement by the shaft 51 the shaft 67 is rocked or rotated to hold the grippers 73 and 74 in generally vertical position. The shaft 67 carries a depending arm 86 adjacent one end and having a dependign rod 87 provided at its lower end with an angled end portion 88. As the transfer mechanism is operated to position the gripper assemblies for pick-up of the eggs from the conveyor 10 the cam rod 87 engages with a cam member 89 (Fig. 4) which is supported on the post 53 to tilt the support plate 71 and position the fixed gripper fingers 73 to clear the tops of the row of eggs and insure that there will be no interference with movement of the grippers into position for engagement with the eggs. The curved end 88 on the rod 87 first engages the cam fixed members 89 and tilts the plate 71 sufficient to insure clearance of the fingers 73 and, as the gripper assemblies descend into the gripping position, allows the fingers 73 to move somewhat nearer to engagement with the eggs.

As the gripper assemblies move into position for engaging the eggs, the arm 65 engages the pin 44 (Fig. 5) on the egg lifter operating arm 43 and rocks the shaft 39 to move the ends of fingers 38 into engagement with the bottoms of the eggs on the conveyor plate 30 and lift the eggs sufficient to insure that they are properly seated or engaged between the gripper fingers 73 and 74 of the gripper assemblies.

The egg holding and supporting mechanism 12 (Figs. 1, 2 and 7) which carries the eggs in single file succession to a cracking position is mounted on an upstanding plate support 100, which is in turn mounted on a main supporting frame comprising uprights 101 and top frame members 102 which connect the same and which support the upstanding plate 100. The egg supporting and conveying mechanism 12 comprises an endless chain arrangement which is mounted for movement on an idler supporting drum member 103 and a driven supporting drum member 104. The conveyor supporting drum 103 which is mounted on an idler shaft 105 is hexagonal in cross section and provides around its periphery six seats for chain forming members, which will be described. The supporting shaft 105 is adjustably positioned on the supporting plate 100 so that tension in the conveyor can be adjusted. The driven drum 104 which is mounted on the driven shaft 106 is octagonal in section, providing on its periphery eight seats for receiving the chain forming members. The driven shaft 106 is journaled in the support plate 100 and connected to a drive mechanism in a manner which will be subsequently described.

The conveyor forming portion of the mechanism 12 comprises a plurality of supporting plates 107 (Figs. 8 and 9) which have a link forming section 108 and a laterally extending section 109. The link forming section is provided at one side edge with a bearing forming portion or extension 110 for receiving the connecting pin 111 which joins it with the next adjacent link section 108. On the other side edge the link section 108 is provided with a pair of spaced bearing forming extensions 112 for receiving the connecting pin 111 which joins the link to the next adjacent link. The link section 108 supports on its outer face a cup member 15 which is adapted to receive and grip one end of an egg when the latter is positioned therein with its long axis generally normal to the outer face thereof. The cup member 15 (Figs. 9 and 10) comprises a funnel-shaped rubber section 114 which is positioned on a tubular nipple formation 115 extending outwardly of the plate section 108. The tubular nipple 115 is seated over an aperture 116 in the plate section 108 which provides a passageway for suction from the interior of the cup member 114 through the plate section 108. The rubber cap member 114 is provided with an internal flange or shoulder 117 which, when the cup is positioned on the nipple 115, is in spaced relation to the end of the nipple 115, and a sponge rubber pad 118 is positioned between the flange 117 and the end of the nipple, which permits suction applied to the passageway internally of the nipple 115 to be effective on the end of an egg positioned on the cup member 114. The flange 117 cooperates with the vacuum pull on the end of the egg to force the shell together in the case of a cracked egg and prevents loss of albumen, which would otherwise occur due to the action of the vacuum. It also insures that the end of the egg will not strike the end of the nipple 115.

Each of the plates 107 carries on the outwardly extending portion 109 a combination egg gauge and cutter or cracking knife assembly 119. The knife assembly 119 is received and supported on the plate section 109, primarily by a hollow post 120, which extends outwardly normal to the face of the plate section 109, the latter being apertured at 121 to provide a passageway through the plate section 109 for a supporting and guiding post member 122 which carries at one end the support or base plate 123 for the gauge and breaker assembly 119. The base plate 123 is generally rectangular in shape with a relatively large aperture or recess 124 at the one end which is of generally circular formation and which is open at one side. The supporting post 122 is arranged adjacent one edge of the plate 123 so that when the post is positioned in the support 120 on the plate section 109 the plate 123 is positioned in spaced parallel relation above the plate 107 and the top portion of the rubber egg holding cup 114 is received within the aperture 124. At a corner of plate member 123 opposite the aperture 124 there is provided a downwardly extending hollow post 125 which is open at the side facing outwardly of the corner of the plate member 123 and which receives the pin 126 on the upper end of which there is supported a breaker knife 127, the pin 126 being supported in rotatable relation in the hollow post 125 and the pin 126 and knife 127 being removable outwardly through the open side of the post 125. The cracking or breaking knife 127 carries at its outer or free end a blade section 128 having a cutting edge which is curved to correspond generally with the curvature of the aperture 124. The blade 128 is arranged so that when it is pivoted to closed or cutting position and the end 129 engages with a rubber stop member 130 on the end of the base plate 123 the knife 128 and the curved section of the plate 123 defining the aperture 124 form a generally circular or closed aperture corresponding approximately in shape to the cross section of a normal egg but being somewhat smaller in size than the cross section of the smallest egg which would be likely to be fed to the machine for cracking. When the complete knife assembly is mounted on plate 107 the pin 126 is received in and extends through an aperture 131 in the outer end of the plate section 109 and arranged below the aperture 131 there is a bent wire spring 132 secured at one end to the plate 107 and with its free end movable across the opening 131 to engage in a peripheral groove 133 on the end of pin 126 and prevent removal therefrom the plate 107. The knife arm 127 extends beyond the pivot pin 126 at the end opposite the knife edge 128 and is pointed at its outer end at 134 for engagement with the inner edge of a latch plate 135. The latch plate 135 forms the head portion of a T-shaped latch member 136 on which the stem portion 137 and the head portion 135 are in planes at right angles to each other and the stem portion 137 is pivotally mounted at 138 on the inner or bottom face of base plate 123. The stem 137 of the latch member 136 and the knife arm 127 are connected by a tension spring 139 which is mounted at opposite ends on pins 140 and 141, on the latch stem 137 and the knife arm 127, respectively. The spring 139 urges the latch plate 135 into latching position for engagement with the end 134 of the knife arm 127 and also urges the knife arm 127 towards the aperture 124 in the plate 123 for the cracking operation. The base plate 123 may be notched, if required, at the edge adjacent the pivot post 125 to clear the pin 141. The corner of the plate 123 may also be notched at 142 to receive the inner edge of the latch plate 135 and provide a stop for the latter. The pin 126 carries in fixed relation thereon a bell crank having arms 143 and 143' which control the movement of the knife assembly in a manner which will be described subsequently. The base plate 123 also carries at the inner side of the aperture 124 a depending flange portion 144 which extends along the inner side of the egg holding cup 15 and which is for a purpose which will be described subsequently. Each of the plates 107 which constitute the conveyor carries one of the cracking assemblies 119.

Certain of the plates 107 carry an angle plate member 145, which will be referred to subsequently. The drum 104 supporting the leading end of the breaking conveyor is provided with a series of vacuum passageways 146 (Fig. 11) having a radial portion terminating in the center of each face or seat 147 for the conveyor chain plates 107 with a washer or pad 148 of suitable material to form a seal around the aperture 116 in the plate portion 108. The passageways 146 have an axial portion which is connected to a suitable source of vacuum by means of a suction box 149 which is mounted between the supporting plate 100 and the driving drum 104. The suction box 149 is provided with a semicircular port 150 opening on the outer face which engages with the inner face of the driving drum 104, which port 150 is aligned with the inner openings or terminals of the passageways 146 for a portion of the movement of the drum 104 around the end of the conveyor. The port 150 in the suction box 149 is connected by a passageway 151 and connecting members 152 with a source of vacuum (not shown). As the plate section 108 passes around the drum 104 vacuum is applied through the port 150 in the suction box 149 and the passageway 146 in the drum 104 to the cup member 114 which holds the one end of the egg in position therein. The other end of the egg is supported during its movement to the cracking position by mechanism which will be described, subsequently.

The cracking conveyor mechanism 12 is supplied with eggs by the transfer device 11 which moves a row of six eggs into position for delivery above the mechanism 12. The eggs are gripped by the fingers 73 and 74 and mechanism is provided to automatically release them from the gripper fingers for deposit in the rubber holding cups 15 while the conveyor mechanism 12 is in motion. As the transfer mechanism 11 approaches the cups 15 the cam arm or rod 87 is engaged by one of the angle members 145 on the cup carrying plates 107 which causes the arm 87 on the transfer mechanism to move the rock shaft 67 in its axial direction, against the force of the spring 70, with the continuously moving cracking conveyor while the eggs are deposited by opening of the gripper assemblies on the transfer mechanism.

The movable gripper fingers 74 are moved out of gripping engagement with the eggs by engagement of the trip arms 77 with a vertically reciprocating cam or release bar 153 (Fig. 7). The gripper release bar 153 is supported on a pair of vertically extending side arm or post members 154 which are slidably mounted in vertically positioned sleeve members 155 secured on the inner face of the vertical support plate 100. The bar 153 is raised and lowered by means of an operating arm 156 which is mounted for rotation on a shaft 157 journaled in the support plate 100 and which strikes a cross bar 158, extending between the post members 154 below the release bar 153, during a portion of its rotative movement. The shaft 157 extends through the plate 100 and is rotated by the power mechanism in a manner which will be described subsequently.

A vertically positioned cam plate 159 which is mounted on a bracket 160 secured on the top edge of the support plate 100, is arranged at the end of the cam bar 153 for engaging the cam rod 87 on the transfer mechanism 11 to tilt the plate 71 in the clockwise direction sufficient to move the gripper fingers 73 away from the eggs after they are deposited on the conveyor and to permit withdrawal of the transfer mechanism without interference with the eggs as they are advanced by the cracking conveyor mechanism 12. Withdrawal or upward movement of the transfer mechanism releases the rod 87 from engagement with the angle plate 145 on the conveyor and permits the spring 70 to return the gripper assembly mechanism to normal position for picking up the next succeeding row of eggs from feed conveyor 10.

Mechanism is provided for seating the ends of the eggs securely in the cups 15 which comprises a small, generally circular plate 161 (Figs. 3A, 7, 13 and 14) having a sponge rubber pad 162 on the lower face which is adapted to engage the free end of the eggs as they pass beneath the same. The plate 161 is mounted on an angular arm 163 which is secured on a pivot pin 164 journaled in upstanding bearing plates 165 secured on the rear face of the support plate 100. The supporting arm 163 is extended beyond the pivot pin 164 for intermittent engagement by a rotatable cam 166 which is mounted on the end of a stub shaft 167 which is journaled in the frame plate 100 and carries a driving pinion 168 engaging in driving relation with a gear 169 on the conveyor drive shaft 106. The supporting arm 163 is apertured to receive a guide post 170 having its lower end fixed in a boss 171 on the inner face of the frame plate 100 and having a compression spring 172 supporting the bracket arm 163 for cushioned movement on its pivot 164. The cam 166 is operated to intermittently pivot the arm 163 in timed relation to the movement of the eggs on the conveyor mechanism 12 so that each egg is tapped by downward movement of the sponge rubber pad 162 to move securely seat the egg in the cup 15 and insure that the vacuum will be effective on the end of the egg and hold it in the cup as it moves around the end of the drum 104.

As the eggs move around the end of the conveyor mechanism 12 with one end seated in a suction cup 15 thereon the opposite end is received in a cooperating suction cup 16 on a rotary head mechanism 13 (Figs. 7, 14, 15). The latter comprises a carrier head or rotary drum 180 which is arranged for rotation on a shaft 181. The shaft 181 is journaled in the frame plate 100 in alignment with the shafts 105 and 106 and is spaced from the shaft 106 at the leading end of the conveyor mechanism 12. The rotary head 180 is provided with a series of radially extending apertures or slots 182 in the outer face along the sides of each of which are secured a pair of gibs 183 forming guideways for block members 184 of generally rectangular shape which carry the holding cups 16 for engaging the outer ends of the eggs as they pass around the end of the conveyor mechanism 12. Each block 184 is slidable in a guideway 182 and has extending in the radial direction relative to the head 180 a support block 185 on the outer end of which is mounted a nipple forming tubular member 186 which receives on its outer end a funnel-shaped rubber cup forming member 187 of the same construction as the cup forming members 114 on the conveyor 12. The members 184, 185 and 186 are provided with an internal passageway 188 which communicates with the interior of the cup forming member 187 at one end with an under-cut recess 189 on the bottom of the sliding block 184 at the other end. A suction box 190 is provided between the rotary head 180 and the supporting plate 100 which has a semi-circular port 191 on the front face, which is in engagement with the rear face of the head 180, the port 191 being connected, by suitable members, indicated at 192, to a vacuum pump or other source of suction.

A fixed cam plate 193 is supported by a bracket 194 extending forwardly from the frame plate 100 in front of the rotary head 180 and adjacent the outer face thereof. This plate has a cam surface or track 195 which is adapted to engage the forward or outer edge of the support block 185 to limit the outward movement of the cup 16 as it approaches the position where it is released to engage the outer end of the egg in the cup 15 on the conveyor mechanism 12. As the holder cups 16 move away from the cracking position the outer edge of the block 185 engages a cam surface or track 196 on a cam plate 197 which is supported on a bracket 198 extending from the frame plate 100. The cam 197 returns the cup 16 to its innermost position. The inward movement of the cups 16 relative to the center or axis of the head 180 is limited by engagement of the inner end of the slide block 184 with a collar 199 secured on the end of the shaft 181. A stop washer 132' fixed at the outer end of each guideway limits the outward movement of the slide block 184 between the cam plates 193 and 197.

Each cup 16, as it approaches the position where it engages the end of the egg, is snapped toward the egg to insure that it will properly seat on the end thereof and that the vacuum will be effective through the cup body 187. The mechanism for snapping the cups 16 into position as the head rotates the individual cups toward the conveyor mechanism 12 comprises a roller or disk member 200 which is adapted to engage the inner end of the carrier block 185. The roller 200 is rotatably mounted on a shaft 201 which is secured to the lower end of one arm 202 of a bell crank member which bell crank member is pivoted at 203 to the lower end of a depending arm 204. The other arm 205 of the bell crank is connected at its outer end to one end of a tension spring 206. The other end of spring 206 is connected to the end of the upper end of arm 204. The arm 204 is secured on the end of a shaft 207 which is mounted for rocking or rotating movement in a holder or bearing sleeve 208. The sleeve 208 is secured to a plate member 209 which is in turn secured to an upstanding extension plate 210 on the frame plate 100. The shaft 207 carries on its outer end a vertically extending cam operating arm 211 which is adapted to be intermittently struck by a cam plate 212 mounted on the end of a stub shaft 213 which is journaled in the frame plate 100. The shaft 213 is rotated by means of a pinion 214 mounted thereon and in driving engagement with a gear 215 on the shaft 181 which carries the rotary head 180. The gear 215 is connected in driving relation with gear 169 on the drive shaft 106 by means of idler pinion 216 and the cooperating pinion 168 on stub shaft 167. As the head 180 rotates to bring a cup 16 into cooperative relation with a cup 15 on the conveyor mechanism 12 the forward edge of the cup carrier member 185 engages with the cam surface 195 which moves the cup holder radially towards the center of the head 180. During this movement the cam roller 200 engages the rear of the block 185 and urges the same outwardly toward the cam surface 195. The spring 206 is tensioned slightly by rotation of the shaft 207 through engagement of the cam plate 212 with cam arm 211 on the other end of the shaft 207 so that when the cup member 185 moves out of engagement with the cam surface 195 the tension in the spring 206 kicks the cup towards the egg with which it is to be engaged so that the funnel-shaped cup body 187 is snapped against the end of the egg. With this arrangement seating of the end of the egg in the cup member 187 and effective operation of the suction or vacuum through the same is insured.

The egg is firmly engaged on both ends by the suction cups 15 and 16 when it reaches a horizontal position where it is broken or cracked by release of the cocked cracking knife arm 127 which is associated with the suction cup 15. Prior to the release of the cracking knife arm 127 for the cracking operation the entire cracking assembly 119 is moved into the proper position for cracking the egg, the extent of the movement depending upon the size and shape of the egg. A cam plate 217 (Fig. 14), which consists of a relatively thin resilient strip is arranged on a bracket 218, adjustably secured on the upright supporting bracket or post 219 which is mounted on a top bar 102 of the supporting frame. The cam plate 217 engages the bell crank arm 143' on the cracking assembly 119 and moves the entire assembly outwardly away from the supporting plate 107 to position the plate 123 with the recess 124 receiving the egg and with the outer peripheral surface of the egg engaging the edge of the plate defining the recess 124. The peripheral portions of the size gauging plate 123 around the recess 124 engage the egg on its upper side as the plate 123 is moved into position. The knife arm 127 which is in a cocked position extending away from the other side of the egg is released by engagement of the latch plate 135 with a pin 220 on a bracket 221 which is adjustably secured on support post 219. Release of the knife arm 127 permits the spring 139 to snap the knife 128 against the egg surface, the stop member 130 which limits the movement of the knife 128 being so positioned that the knife edge penetrates the shell and cracks the egg permitting the two sections or shell portions into which it is thus divided to be moved apart by continued movement of the cups 15 and 16 in their respective paths. Further movement of the shell portions, of course, dumps the contents of the egg, which falls freely beneath the cracking position.

As the suction cup 15 moves beyond the cracking position the bell crank arm 143 of the cracking assembly 119 engages a roller 222 which is mounted on a shaft 223 supported on a bracket 224 which is secured to the upstanding post 219 and the knife arm 127 is returned to its cocked position with the latch plate 135 re-engaging the end 134 thereof.

Further movement of the cup 15 carries it around on the lower or return run of the conveyor mechanism 12 to a shell releasing mechanism which insures that the empty shell portion will be removed from the cup 15 if it fails to drop free after the cup leaves the end supporting drum 104 and the vacuum is broken. The shell releasing mechanism comprises a supporting plate 225 (Fig. 12) extending beneath the lower run of the conveyor mechanism 12. Plate 225 is supported by means of a pair of posts 226 extending from the vertical supporting plate 100 and carries adjacent its outermost edge a plurality of disks 227 each of which is mounted in freely rotating relation on a small shaft 228. The disks 227 are positioned so that they extend into the path of the cups 15 as the latter passes along the plate 225. The disks 227 each strike the body 114 of the cup 15 so that the cup body 114 is squeezed between the disk and the flange 144 on the knife assembly 119 as it passes each disk. This tends to break the hold of the cup on the egg shell which falls free beneath the conveyor mechanism to a suitable receiving member (not shown). The cracking assemblies 119 are supported along the outer ends of the plates 123 as they pass along the lower run of the conveyor mechanism 12 by an elongate bracket or rail member 229 (Fig. 7) which is adjustably supported on a bracket 230 extending above the frame member 102. A drain pan 231 is provided beneath the conveyor mechanism 12 adjacent the cracking station for receiving any albumen which drains from the shell portion immediately after the cracking and dumping operation.

The other portion of the shell which is held in the cup 16 on head 180 is moved by the head 180 (Fig. 14) to a shell releasing device at the other side of the head which comprises a pair of spaced disks 232 mounted for free rotation on the ends of support pins 233 which are in turn secured to an angle bracket 234 extending outwardly of the vertical frame plate 100. As the cups 16 pass between the disks 232 the ends of the cups are squeezed sufficient to release the egg shell, the vacuum holding it in the cup being also released at this point. A drainage pan 235 is arranged beneath the head 180 to collect any albumen which drains from the egg shell as it passes above the same on the rotary head 180.

When the egg is cracked and the shell portions separated, by continued movement of the cups 15 and 16 in their respective paths, the contents of the egg is dumped and falls into one of a series of receiving cups 17 which are carried on the endless conveyor 14 (Fig. 1). The conveyor 14 is supported for movement in a horizontal plane, with the cups 17 being moved over a generally triangular path having a short side thereof extending beneath the point where the eggs are cracked at the end of the conveyor mechanism 12. The conveyor 14 is supported on the top rails 102 of the main supporting frame at the end forming the short side of the triangle while it is supported along the two longer sides on a triangular supplemental frame 236 attached to the main frame. The conveyor 14 comprises a chain 237 mounted on the three sprockets 238, 239 and 240 which are arranged in triangular relation. The driving sprocket 240 is mounted on a vertical shaft 241 (Fig. 3A) which is supported in an angular bearing bracket 242 on the rear face of the vertical frame plate 100 and an end bearing 243 mounted on the top of the main frame member 102. The shaft 241 carries at its upper end a beveled gear 244 which is in driving relation with a bevel gear 245 on the driven shaft 181. The idler sprockets 238 and 239 are mounted on shafts 246 and 247, the former extending upwardly of the top frame member 102 adjacent the rotary head 180, and the latter extending upwardly of the outer end of the supplemental frame 236. The vertical frame plate 100 is apertured at 248 (Fig. 3A) to permit the conveyor 14 to pass through the same beneath the cracking station.

The conveyor chain 237 carries a substantial number of the cup assemblies 17 which receive the egg contents as it is dumped from the separating shell portions beneath the cracking station. Each of the cup assemblies 17 comprises a generally circular main portion 249 (Figs. 16, 17 and 18) which is flattened along opposite sides to permit closer spacing of the cups on the conveyor chain 237, and a central egg yolk receiving cup section 250 which is movable relative to the main portion 249. The yolk cup 250 is normally positioned in closing relation in a central aperture 251 formed in the bottom of the main cup section 249, the bottom wall sections 249' being tapered downwardly and inwardly in one or more steps toward the central aperture 251. A peripheral flange 252 depends from the main cup section 249 which has an open inner side at 253. A closure cap or plate 254 is arranged at the bottom of the flange 252 which is provided on its upper or inner face with an apertured boss 255 for receiving in sliding relation therein a depending pin 256 on the yolk cup 250. The base plate 254 has attached to the bottom thereof a guideway forming, elongate, rectangular plate 257 in which there is slidably positioned a bar 258 having therein an elongate aperture 259 for accommodating the pin 256 on the yolk cup and having at its outer end an upturned angular portion 260. The flange 252 on the cup member 249 has attached, in fixed relation thereto the leg portions of a U-shaped hanger yoke or bail 261 which is adapted to be positioned with the bight forming portion in a holder 262 attached to the conveyor chain 237.

Each of the holders or cup supporting brackets 262 comprises a horizontal flange portion 263 which is attached by suitable rivets to the top plate of a chain link or to the ends of the pivot members connecting the chain links, and a vertical flange portion 264 depending from the chain 237 and terminating in a reversely bent end portion 265 having an outwardly directed lip 266. The reversely bent portion 265 provides a pocket for readily detachably receiving the bail 261 on the cup assembly 17. The bail 261 is held in the pocket of the supporting bracket 262 by a latching member which comprises a generally U-shaped frame with the lower or end portions of the legs 267 positioned to extend downwardly along the side edges of the vertical plate portion 264 and with the upper portions of the legs and the bight portion 268 extending above the flange portion 263 of the bracket 262. The latching member is attached to the bracket 262 by means of a pivot rod 269 secured to the forward edge of the flange 263 and having its ends extending through suitable bearing apertures in the leg portions 267. The weight of the bight portion 268 tends to hold the legs 267 with their ends over the bight portion of the cup bail 261 when it is attached to the hanger bracket 262. With this arrangement each cup assembly 17 is connected in latched relation with its hanger bracket 262 but the latch may be quickly swung to release the bail 261 and permit the cup assembly 17 to be readily removed from the conveyor 14. The cup assemblies 17 are also connected to the hangers 262 so that they will normally swing in a downward direction unless they are supported.

A supporting rail 270 is arranged in generally parallel relation with the path of travel of the conveyor chain 237 and extending along a major portion thereof, which supports the bottom of the cup assemblies 17. The rail 270 extends through the aperture 248 in the vertical frame plate 100 and beneath the cracking station to hold the cup assemblies 17 in horizontal position for receiving the contents of the eggs as they are dumped from the broken shell portions thereof at the cracking station. The supporting rail 270 extends around the sprocket 238 and a predetermined distance along the path of the chain 237 between the sprockets 238 and 239. The cup assemblies 17 are supported in horizontal position and in assembled relation for a sufficient distance to permit the operator of the machine to observe the condition of the contents of the eggs so that any cup assembly may be removed when the egg which it receives appears to be undesirable. The yolk cup 250 remains in closing relation in the bottom aperture 251 of each cup assembly 17 until the cup reaches a cam plate which has an inclined portion 271 which lifts the stem 256 of the yolk cup 250 a sufficient distance above the aperture 251 to permit the albumen or egg white in the cup to drain through the aperture 251 and into a suitable receptacle or pan 272 arranged beneath the portion of the path of travel of the conveyor. The cam plate 271, which is relatively short, extends inwardly in the direction of the conveyor chain 237 from the supporting rail 270 and is supported from the latter or by suitable brackets extending from the auxiliary supporting frame 236 which also supports the rail 270 at this point. As the cup assembly 17 passes over the end of the horizontal portion 273 of the cam plate the pin 256 drops the yolk cup 250 and cuts off the egg white against the edges of the aperture 251. A second inwardly extending cam plate is arranged, slightly beyond the end of cam plate 271 with an upwardly inclined end portion 274 which again raises the yolk cup stem 256 to permit further drainage of the albumen from the cup as the cup assembly 17 moves along a horizontal portion 275 thereof around the end sprocket 239. The pan 272 for collecting the albumen which drains from the cup during this period of operation may be extended to the end of the conveyor 14 and is supported in generally horizontal position by suitable bracket members extending from the supplemental frame 236. The rail 270 terminates beyond the sprocket 239 on the back run of the conveyor where the cup assemblies 17 are supported for a short distance by an elongate plate 276 (Fig. 1) which also raises the pins 256 and with them the yolk cups 250 to permit further drainage of the albumen from the main cup sections 249 of the cup assemblies 17. The plate 276 is supported by a bracket structure 277 extending outwardly of the frame 236. The bracket structure 277 also provides a support for a removable drainage pan 278 arranged beneath the plate 276 to receive any albumen which drains from the cups 17. As the cup assemblies 17 pass beyond the end of the supporting plate 276 they normally swing to a vertical position and allow the yolks which are retained in the yolk cups 250 to be dumped into a pan or chute 279 (Fig. 3B) arranged beneath the conveyor. An outwardly positioned support bar 280 is arranged on the bracket structure 277 which engages beneath the end of the slide bar 258 when the latter has been moved to an outwardly extending position by operator. This is done when it is desired to separate out a dark yolk. The operator merely moves the slide bar 258 outwardly to its outermost position when he observes the dark yolk and when the cup assembly with the slide bar 258 extended reaches the end of the support plate 276 it is still held in horizontal position by the support bar 280 until it reaches the end of the latter when it is allowed to swing into a vertical position and dump the yolk into a second pan or chute 281 arranged beneath the conveyor. As the cup assemblies pass beyond the chute 281 they are engaged by an upwardly inclined portion 282 of the supporting rail 270 which swings them into a horizontal position for movement along the short side of their path beneath the cracking station.

As the cup assemblies 17 swing to the vertical position for dumping or discharging the yolks the slide bars 258 which are not already extended move to their outermost position by gravity. They are returned to normal retracted position by engagement of their ends with a resilient cam plate 283 (Fig. 1) which is supported on the main frame of the machine by a bracket 284.

The main drive for the machine is positioned on the rear face of the vertical frame plate 100 (Fig. 3A). It comprises a motor or other power source (not shown) with a driven belt or chain, which drives a speed reduction or control unit indicated at 285. The output gear 286 on the latter is in driving engagement with the gear 169 on the drive shaft 106 for the conveyor mechanism 12. The gear 169 is in driving relation with a gear 287 on the shaft 157. A bevel gear 288 carried on the end of the shaft 157 is in driving engagement with bevel gear 289 on the end of shaft 62, the latter being journaled in bearings 290 mounted on the frame plate 100. The connections between these driven members and the operating mechanisms of the machine have been previously described.

I claim:

1. An egg handling machine, comprising a continuously operating egg carrying conveyor having a series of gripping members thereon for engaging the ends of a plurality of eggs, an intermittently operating egg feed conveyor, a transfer mechanism for delivering eggs from the feed conveyor to the carrying conveyor, a continuously operating holding conveyor having a series of gripping members thereon for cooperation with the gripping members on the carrying conveyor to position the successive eggs at a breaking station with the long axis generally horizontal, a size gauging and shell breaking assembly operatively connected with said gripping members to break the egg shells, the broken portions of the egg shells being separated as they advance and the contents thereof being discharged beneath the same, a conveyor having a plurality of receiving receptacles mounted thereon and movable intermittently into position to receive the contents of successive eggs as they are broken and the broken shell portions are moved apart, said receptacles having a movable yolk cup, and means cooperating with said receptacles along the path of movement thereof to move the yolk cup relative to the body of each receptacle and thereby separate the yolk and the albumen and discharge the same separately from said receptacles.

2. An egg handling machine, comprising an endless egg carrying conveyor having a series of gripping devices thereon for engaging a plurality of eggs, an egg feed conveyor, a transfer mechanism for delivering eggs from the feed conveyor to the carrying conveyor, a holding conveyor having a series of gripping devices thereon for cooperation with the gripping devices on the carrying conveyor to engage and position successive eggs at a cracking station with the long axis generally horizontal, a size gauging and cracking assembly connected with said gripping devices to crack the egg shells and permit the same to separate into two portions as the gripping devices are advanced by the conveyors, whereby to discharge the egg contents beneath the same, a conveyor having a plurality of receiving receptacles mounted thereon and movable into position to receive the contents of successive eggs as they are cracked and the broken shell portions moved apart said receptacles having movable yolk separating portions and means cooperating with said receptacles along the path of movement thereof to move said receptacle portions to separate the yolk from the albumen and to discharge the yolk and the albumen separately from said receptacles.

3. An egg handling machine, comprising an egg carrying conveyor traveling in an endless path and having a series of gripping members thereon for engaging the ends of eggs positioned thereon, an egg feed conveyor, a transfer mechanism for delivering eggs from the feed conveyor to the carrying conveyor, a holding conveyor traveling in an endless path and having a series of gripping members thereon for cooperating with the gripping members on the carrying conveyor to engage and position successive eggs with the long axis generally horizontal, size gauging and shell cracking means connected with said gripping members and operable to break the egg shells, the broken portions of the shells being separated as they are advanced by the conveyors and the contents thereof being discharged beneath the same, a separating conveyor having a plurality of receiving receptacles mounted thereon and movable into position to receive the contents of successive eggs as they are cracked and the broken shell portions are moved apart, said receptacles having relatively movable yolk and albumen separating portions and means cooperating with said receptacles along the path of movement thereof to move said receptacle portions to separate the yolk and the albumen and to discharge the same separately from said receptacles.

4. An egg handling machine, comprising a continuously operating endless egg carrying conveyor having a series of gripping members thereon for engaging the ends of eggs positioned thereon, an intermittently operating feed conveyor for supplying successive rows of eggs, a transfer mechanism for delivering successive rows of eggs from the feed conveyor to the carrying conveyor, a continuously operating endless holding conveyor having a series of gripping members thereon for cooperating with the gripping members on the carrying conveyor to engage and position successive eggs with the long axis generally horizontal, size gauging and cracking mechanism connected to said gripping members and operative to break the egg shells whereby the broken portions thereof are separated as they are advanced by the conveyors and the contents dumped beneath the same, an endless receiving conveyor having a plurality of receptacles mounted thereon, means to move said receiving conveyor intermittently to position the receptacles to receive the contents of successive eggs as the contents are dumped from the cracked and separating shells, said receptacles having a body portion and a yolk receiving portion and means cooperating with said receptacles along the path of movement thereof to move said receptacle portions relative to each other and separate the yolk from the albumen.

5. In an egg cracking and separating mechanism, a conveyor for delivering successive rows of eggs to a transfer station, an egg carrying conveyor operable in a plane extending transversely of the path of said delivery conveyor and having a plurality of pocket forming egg receiving members spaced along the same, an oscillating transfer device at the transfer station for moving successive rows of eggs from the delivery conveyor to the carrying conveyor, a holding conveyor operable in the same plane at the leading end of said carrying conveyor and having pocket forming members thereon cooperating with the pocket forming members on the carrying conveyor to support successive eggs therebetween with the long axis of the eggs arranged in generally horizontal position for a predetermined portion of their movement, cracking members arranged to engage and crack the shells of successive eggs while the latter are in the horizontal position, a receiving conveyor having a plurality of receptacles thereon and movable in a path to position the successive receptacles beneath the eggs as the shells are cracked and the contents dumped, and means cooperating with said receptacles to hold the same in position for inspection and thereafter to separate the yolks and the whites as the receptacles are advanced by said receiving conveyor.

6. In an egg cracking and separating mechanism, means for delivering successive rows of eggs to a transfer station, an endless egg carrying conveyor having a plurality of pocket forming egg receiving members spaced along the same, means for moving successive rows of eggs from the transfer station to the carrying conveyor, a holding conveyor operable in the same plane at the leading end of said carrying conveyor and having pocket forming members thereon cooperating with the pocket forming members on the carrying conveyor to support the eggs therebetween with the long axis of the eggs arranged in generally horizontal position for a predetermined portion of their movement, shell cracking assemblies operable to engage and crack the shells of successive eggs while the latter are in the horizontal position, a receiving conveyor having a plurality of receptacles thereon and movable in a path to position the successive receptacles beneath the eggs as the shells are cracked and the contents dumped by movement of the receiving pockets beyond the horizontal position, and means cooperating with said receptacles to separate the yolks and the whites and finally to discharge the yolks as the receptacles are advanced by said receiving conveyor.

7. In an egg cracking machine, an endless chain conveyor, spaced rotatable drums supporting said chain for movement in a vertical plane, said chain having egg supporting and gripping means including a base plate, said base plate having mounted thereon an egg cracking assembly, said cracking assembly including a cracking knife and a size gauging device, said cracking assembly being movable outwardly of said base plate to adjust the position of the cracking knife for the cracking operation in accordance with the size of the egg.

8. In an egg cracking machine, an endless chain conveyor, spaced rotatable drums supporting said chain for movement in a vertical plane, said chain comprising a series of outwardly opening suction cups, each of said suction cups being mounted on a base plate, and each of said base plates having mounted thereon an egg cracking assembly, said cracking assembly including a cracking knife and a cooperating size gauging device movable relative to said base plate to adjust the position of the cracking knife in accordance with the size of the egg.

9. In an egg cracking machine, an endless conveyor having egg gripping elements and associated egg cracking members thereon, and spaced rotatable drums supporting said conveyor for movement in a vertical plane, said egg gripping elements including a base plate and an outwardly opening suction cup, said base plate having means thereon for slidably receiving the egg cracking members, said egg cracking members including a cracking knife and a size gauging ring mounted on a connecting plate member, said connecting plate member being slidable outwardly of said base plate to position the size gauging ring for encircling the middle portion of an egg when the egg is held by the associated gripping elements, and means for moving the cracking knife relative to the size gauging ring.

10. In an egg cracking machine, an endless conveyor having mounted thereon a series of base plates, each of said base plates having an outwardly opening suction cup for engaging an egg at its one end, each of said base plates having mounted thereon an egg cracking assembly for breaking the shell of the egg, said cracking assembly including a support plate having pivotally mounted thereon a cracking knife and a cooperating positioning member, said support plate being movable outwardly of said base plate to locate the positioning member for operation of the cracking knife in the vicinity of the middle of the egg, said positioning member having a stop thereon for limiting the movement of the knife to relatively slight penetration of the shell.

11. In an egg cracking machine means to support an egg comprising a pair of cooperating cups engageable with opposite ends of the egg, a size gauging device movably mounted adjacent one of said cups, means to advance said gauging device along the long axis of the egg to shell cracking position intermediate the ends thereof and in the space between the cups, a cracking knife movably mounted adjacent said gauging device, means to move the cracking edge of said cracking knife toward and from the egg in a plane generally transverse to the long axis thereof whereby to pierce the egg shell when said gauging device is moved to shell cracking position.

12. In an egg cracking machine means to support an egg comprising a pair of cooperating cups movable into engagement with opposite ends of the egg, a gauging device movably mounted adjacent one of said cups, means to move said gauging device along the long axis of the egg to shell cracking position intermediate the ends thereof, a cracking knife having a shell piercing edge mounted on said movable gauging device, said cracking knife being pivotally mounted for movement of said shell piercing edge toward and from the egg in a plane generally transverse to the long axis thereof, means to resiliently urge said knife toward the egg, means to hold said cracking knife in a cocked position and means to release said knife to pierce the egg shell upon movement of the gauging device to the shell cracking position.

13. In an egg cracking machine means to support an egg comprising a pair of cooperating grippers movable into engagement with opposite ends of the egg, a size gauging device movably mounted adjacent one of said grippers, said gauging device having a gauging ring adapted to encompass the egg, means to move said gauging ring outwardly along the long axis of the egg to position the same intermediate the ends thereof, a cracking knife pivotally mounted adjacent said gauging device, said cracking knife having a curved shell piercing edge adapted to move toward and from the egg in a plane generally transverse to the long axis thereof, means to position said cracking knife in cocked relation, and means to release said knife to pierce the egg shell upon movement of the gauging ring to its outermost position on the egg.

14. In an egg cracking machine means to support an egg comprising a pair of cooperating gripper members movable to engage with opposite ends of the egg, a gauging device including a gauging ring partially encircling the egg movably mounted adjacent one of said gripper members, said gauging ring being adapted to move outwardly along the long axis of the egg to position the same intermediate the ends thereof, a shell cracking assembly including a curved knife blade mounted on said gauging device, said knife blade being mounted for pivotal movement toward and from the egg in a plane generally transverse to the long axis thereof, said cracking assembly being bodily movable with said gauging device, spring means urging said knife blade toward the egg, a catch for holding said knife blade in a retracted and cocked position while said gripper members are moved into egg supporting position, and means to thereafter successively move said gauging ring outwardly and release said knife blade for the cracking operation.

15. An egg handling machine comprising an egg carrying conveyor having means thereon for gripping the ends of a plurality of eggs and advancing the same in an endless path, movable means cooperating with said conveyor to grip the opposite ends of said eggs during a portion of the movement thereof and to position the eggs with the long axis thereof generally horizontal, size gauging means operatively connected with one of said gripping means, shell cracking means operatively connected with said last mentioned gripping means and positioned for the cracking operation by said size gauging means, means to operate said shell cracking means to penetrate the shells while the eggs are gripped at opposite ends whereby to permit the shells to be separated and the contents discharged therefrom upon movement of the shells away from each other.

16. An egg handling machine comprising an egg carrying conveyor having means thereon for gripping the ends of a plurality of eggs and advancing the same in an endless path, a second conveyor having means thereon cooperating with the egg gripping means on said carrying conveyor to grip the opposite ends of said eggs during a portion of the movement thereof and to position the eggs with the long axis thereof generally horizontal, size gauging and shell cracking means connected with the egg gripping means on one of said conveyors for gauging successive eggs and for cracking the shells of the eggs at predetermined points while the eggs are gripped at opposite ends whereby to permit the shell of each egg to be separated into two approximately equal portions and the contents discharged therefrom, said conveyors being so arranged that the shell portions are moved away from each other after the cracking operation.

17. An egg handling machine comprising an egg carrying conveyor having means thereon for gripping the ends of a plurality of eggs and advancing the same in an endless path, a second conveyor having movable means thereon cooperating with the egg gripping means on said carrying conveyor to grip the opposite ends of said eggs during a portion of the movement thereof and to position the eggs with the long axis thereof generally horizontal, said second conveyor having means connected therewith to automatically position the egg gripping means thereon for engagement with eggs of varying size, size gauging means connected with the egg gripping means on one of said conveyors, shell cracking means connected with said size gauging means and operable to penetrate the shells while the eggs are gripped at opposite ends, said shell cracking means being positioned for the cracking operation by said size gauging means, whereby to permit the shells to be divided into separate portions and the contents discharged therefrom, said conveyors being arranged to move said shell portions away from each other after the cracking operation.

18. In an egg handling apparatus, an endless conveyor supported on a pair of spaced drums, said conveyor having a plurality of egg gripping cups mounted thereon, means cooperating with one of said drums for applying suction to said cups as they pass around said drum, a rotatable frame mounted adjacent said last mentioned drum and having thereon a plurality of egg gripping cups adapted to be moved into cooperating opposed egg gripping relation to the suction cups on said conveyor as the latter pass around said last mentioned drum, means cooperating with said frame for applying suction to said last mentioned cups, size gauging rings mounted on said conveyor adjacent each of said suction cups, each of said gauging rings being movable into encircling relation to an egg gripped between cooperating cups, and a cracking knife mounted for movement relative to each of said gauging rings to crack the shells of the eggs while they are gripped between said cups.

19. In an egg handling apparatus, an endless conveyor supported on a pair of spaced drums, said conveyor having a plurality of egg gripping cups mounted thereon, means cooperating with one of said drums for applying suction to said cups as they pass around said drum, a rotatable frame mounted adjacent said last mentioned drum and having thereon a plurality of cups adapted to be moved into cooperating opposed egg gripping relation to the suction cups on said conveyor as the latter pass around said last mentioned drum, means cooperating with said frame for applying suction to said last mentioned cups, size gauging rings mounted on said conveyor adjacent each of said suction cups, each of said size gauging rings being movable into encircling relation to a middle portion of an egg gripped between cooperating cups, a cracking knife mounted for movement relative to each of said gauging rings to crack the shells of the eggs while they are gripped between said cups and permit the shells to be divided into two portions, and stripper means in the path of movement of each shell portion to strip the shell portions from the suction cups.

20. An egg contents separating means comprising an endless conveyor having a plurality of receptacles swingably mounted thereon, each of said receptacles being adapted to receive the contents of an egg, said receptacles each comprising an outer pan-forming portion having a central aperture and a yolk receiving cup in said aperture, said cup being mounted on a vertical pin, said outer pan-forming portion having a depending tubular extension communicating with said central aperture and having a side opening, a bottom plate on the bottom of said tubular extension, a vertically extending socket on said bottom plate for receiving said pin in sliding relation therein, a guideway formation on said bottom plate and a slide bar therein having one end adapted to be moved to an outwardly extending position, a supporting rail extending beneath the bottom plate on said receptacles along a portion of the path of said receiving conveyor for maintaining said receptacles in a horizontal position during their movement along said portion of said conveyor path, said receptacles being normally swingable to a contents dumping position at the end of said supporting rail, a supplemental rail extending a predetermined distance beyond said supporting rail and engageable beneath said slide bar when said slide bar is moved to outwardly extending position to permit selected receptacles to be maintained in horizontal non-dumping position for a predetermined distance beyond the end of said supporting rail.

21. An egg contents separating means comprising an endless conveyor having a plurality of receptacles mounted thereon, which receptacles are adapted to receive the contents of an egg, said receptacles each comprising an outer pan-forming portion having a central aperture and a yolk receiving cup seated in said aperture, said cup being mounted on a vertical pin, said outer pan-forming portion having a depending portion provided with a vertically extending socket for receiving said vertical pin in sliding relation therein, said receptacle having a guideway formation and a slide bar mounted therein and having one end adapted to be moved to an outwardly extending position, a supporting rail extending along a portion of the path of said conveyor for supporting said receptacles in a horizontal position during their movement along the same, said receptacles being swingable relative to said conveyor to a contents dumping position at the end of said supporting rail, a supplemental rail extending a predetermined distance beyond said supporting rail and engageable beneath said slide bar when the end of said slide bar is moved to outwardly extending position whereby to permit selected receptacles to be maintained in non-dumping position for a predetermined distance beyond the end of said supporting rail.

22. In an egg cracking and separating mechanism, a conveyor for delivering eggs to a transfer station, a continuously moving egg carrying conveyor operable in a plane extending transversely of the path of said delivery conveyor and having a plurality of pocket forming egg receiving members spaced along the same, an oscillating transfer device at the transfer station for moving the eggs from the delivery conveyor to the carrying conveyor, a continuously moving egg holding conveyor operable in the same plane at the leading end of said carrying conveyor and having pocket forming members thereon cooperating with the pocket forming members on the carrying conveyor to support successive eggs therebetween with the long axis of the eggs arranged in generally horizontal position for a predetermined portion of their movement, cracking members arranged to engage and crack the shells of successive eggs while the latter are in a horizontal position, a continuously moving egg contents receiving conveyor having a plurality of receptacles thereon and movable in a path to position the successive receptacles beneath the eggs as the shells are cracked and the contents dumped, and means cooperating with said receptacles to hold the same in position for inspection, to separate the whites from the yolks, and thereafter to dump the yolks as the receptacles are advanced by said receiving conveyor.

23. In an egg cracking machine, cooperating conveyors operable in the same plane for delivering successive eggs to a cracking station with the long axis thereof in the plane of operation of said egg delivering conveyors, means at the cracking station to crack the eggs, said conveyors being operable to separate the cracked shell portions and dump the contents therefrom, and means to separate the whites from the yolks, said separating means comprising an endless conveyor operable in a generally horizontal plane and a plurality of receptacles mounted therealong for swinging movement laterally of said last mentioned conveyor, means cooperating with said conveyor and said receptacles to position successive receptacles in a horizontal plane and to support the same for receiving the contents of an egg at said cracking station, said receptacles each comprising an open topped pan having a central bottom aperture and a vertically movable yolk receiving cup mounted in said aperture, means connecting one end of said pan to said last mentioned conveyor for swinging movement on an axis extending longitudinally of the conveyor, a rail extending along said last mentioned conveyor and positioned to engage beneath said receptacles and support the same in upwardly opening horizontal position beyond said cracking station and means at predetermined points along said rail for raising said yolk cup relative to said pan to permit the white to drain out of the pan through the central aperture therein and thereby separate the white from the yolk, said rail being terminated at a predetermined point along said last mentioned conveyor and beyond said yolk cup raising means whereby said receptacles will be disengaged from said rail at the end thereof and swing to a vertical position to thereby discharge the yolk therefrom.

24. In an egg cracking and separating mechanism, a conveyor for delivering eggs to a transfer station, a continuously moving endless egg carrying conveyor at the transfer station, a plurality of pocket forming egg receiving members spaced along the same, a transfer device at the transfer station for moving eggs from the delivery conveyor to the carrying conveyor, a continuously moving egg holding conveyor operable at the leading end of said carrying conveyor and located in the same plane, said egg holding conveyor having pocket forming members thereon cooperating with the pocket forming members on the carrying conveyor to support successive eggs at a cracking station between the conveyors with the long axis of the eggs in the plane of operation of said conveyors, means cooperating with the conveyors to engage and crack the shells of successive eggs at the cracking station, a continuously moving egg contents receiving and separating conveyor having a plurality of receptacles thereon, means cooperating with said conveyor to move the successive receptacles in a generally horizontal path beneath the cracking station as the shells are cracked and the contents dumped at said station, means cooperating with said separating conveyor and said receptacles for supporting said receptacles beyond said station in an upright position for inspection, means cooperating with said separating conveyor and said receptacles for separating the whites from the yolks and for removing the whites from the receptacles, and said receptacle supporting means being terminated beyond said separating means whereby said receptacles tilt and dump the yolks as the receptacles are advanced by said separating conveyor beyond said receptacle supporting means.

25. In an egg cracking machine, an egg contents separating mechanism comprising an endless conveyor and a plurality of egg separating receptacles pivotally mounted thereon to extend laterally of the path of the conveyor, or to swing downwardly about their pivotal mountings to a generally vertical contents dumping position, means at a point along the path of movement of said conveyor and cooperating therewith to position successive receptacles in a generally horizontal plane beneath a cracking station for receiving the contents of an egg as the egg is cracked at said station and the shell portions are separated, means cooperating with said separating receptacles for operating said receptacles to separate the whites from the yolks, and means cooperating with said conveyor to position said receptacles in a generally horizontal plane as they are moved by said conveyor beyond said white and yolk separating means which last mentioned receptacle positioning means comprises a support mounted laterally of and extending along the conveyor beyond said first mentioned receptacle positioning means and a member mounted on said receptacles and movable into and out of a position to engage said support whereby said member may be manually positioned to permit selected receptacles to swing about their pivotal mountings to the contents dumping position at a predetermined point in their path of movement.

26. An egg separating mechanism comprising a conveyor and a plurality of egg separating receptacles pivotally mounted thereon to extend outboard of the path of the conveyor or to swing downwardly about their pivotal mountings to a generally vertical contents dumping position, means cooperating with said conveyor for supporting successive receptacles along a portion of said conveyor for movement in a generally horizontal plane beneath a cracking station for receiving the contents of an egg as the egg is cracked at said station and the contents is discharged therefrom by separating movement of the shell portions, means for supporting said receptacles in an elevated position as they are carried from said cracking station to an inspection station, said receptacles having movable white and yolk receiving portions, means adjacent said inspection station and cooperating with said separating receptacles for selectively moving said white and yolk receiving portions relative to each other to separate the whites from the yolks, means beyond said inspection station and said first mentioned receptacle supporting means for supporting said receptacles in an elevated position as they are advanced by said conveyor, a manually movable member on said receptacles adapted to be positioned for engagement or non-engagement with said last mentioned supporting means whereby said member may be positioned on selected receptacles to cause said receptacles to swing downwardly about their pivotal mountings and free of said last mentioned supporting means to the contents dumping position at a predetermined point in their path of movement.

References Cited in the file of this patent

UNITED STATES PATENTS

| | | |
|---|---|---|
| 2,018,044 | Weiss | Oct. 22, 1935 |
| 2,090,963 | Reese | Aug. 24, 1937 |
| 2,093,437 | Gwinn | Sept. 21, 1937 |
| 2,229,349 | Sigler | Jan. 21, 1941 |
| 2,443,188 | Hodson | June 15, 1948 |
| 2,465,176 | Serbu | Mar. 22, 1949 |
| 2,521,907 | Gill | Sept. 12, 1950 |
| 2,536,057 | Hodson et al. | Jan. 2, 1951 |